United States Patent
Jeong et al.

(10) Patent No.: US 9,406,933 B2
(45) Date of Patent: Aug. 2, 2016

(54) NEGATIVE ACTIVE MATERIAL, NEGATIVE ELECTRODE AND LITHIUM BATTERY INCLUDING NEGATIVE ACTIVE MATERIAL, AND METHOD OF MANUFACTURING NEGATIVE ACTIVE MATERIAL

(71) Applicant: Samsung SDI Co., Ltd., Yongin-si, Gyeonggi-do (KR)

(72) Inventors: Chang-Ui Jeong, Yongin-si (KR); Young-Ugk Kim, Yongin-si (KR); Jae-Hyuk Kim, Yongin-si (KR); Yo-Han Park, Yongin-si (KR); Seung-Uk Kwon, Yongin-si (KR); Soon-Sung Suh, Yongin-si (KR); Duk-Hyoung Yoon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 216 days.

(21) Appl. No.: 14/315,000

(22) Filed: Jun. 25, 2014

(65) Prior Publication Data
US 2015/0056509 A1 Feb. 26, 2015

(30) Foreign Application Priority Data
Aug. 22, 2013 (KR) .................. 10-2013-0099882

(51) Int. Cl.
*H01M 4/38* (2006.01)
*B22F 9/04* (2006.01)
*H01M 10/052* (2010.01)
*C22C 1/02* (2006.01)
*C22C 1/04* (2006.01)

(52) U.S. Cl.
CPC ............... *H01M 4/386* (2013.01); *C22C 1/02* (2013.01); *C22C 1/045* (2013.01); *H01M 10/052* (2013.01); *B22F 9/04* (2013.01); *B22F 2998/10* (2013.01)

(58) Field of Classification Search
CPC ........................... H01M 4/386; H01M 10/052
See application file for complete search history.

(56) References Cited

U.S. PATENT DOCUMENTS

| | | | |
|---|---|---|---|
| 2007/0122702 A1 | 5/2007 | Sung et al. | |
| 2008/0145759 A1 | 6/2008 | Sung et al. | |
| 2008/0248389 A1 | 10/2008 | Jeong et al. | |
| 2013/0266865 A1* | 10/2013 | Kwon ............... | H01M 4/386 429/220 |

FOREIGN PATENT DOCUMENTS

| | | |
|---|---|---|
| JP | 2005-11650 | 1/2005 |
| KR | 10-2005-0090220 A | 9/2005 |
| KR | 10-2007-0056323 A | 6/2007 |
| KR | 10-0814816 B1 | 3/2008 |
| KR | 10-2008-0072025 A | 8/2008 |
| KR | 10-2008-0090654 A | 10/2008 |

\* cited by examiner

*Primary Examiner* — Stewart Fraser
(74) *Attorney, Agent, or Firm* — Knobbe Martens Olson & Bear LLP

(57) ABSTRACT

A negative active material, a negative electrode and a lithium battery including the same, and a method of manufacturing the negative active material are disclosed. The negative active material includes a silicon-based alloy including Si, Al, and Cu. Since the silicon-based alloy includes AlCu and $Al_2Cu$ as inactive phases, the lifespan of a lithium battery may be increased.

19 Claims, 7 Drawing Sheets

NEGATIVE ACTIVE MATERIAL, NEGATIVE ELECTRODE AND LITHIUM BATTERY INCLUDING NEGATIVE ACTIVE MATERIAL, AND METHOD OF MANUFACTURING NEGATIVE ACTIVE MATERIAL

CROSS-REFERENCE TO RELATED APPLICATIONS

Any and all priority claims identified in the Application Data Sheet, or any correction thereto, are hereby incorporated by reference under 37 CFR 1.57. For example, this application claims the benefit of Korean Patent Application No. 10-2013-0099882, filed on Aug. 22, 2013, in the Korean Intellectual Property Office, the disclosures of which are incorporated herein by reference in their entirety.

BACKGROUND

1. Field

The disclosure relates to a negative active material, a negative electrode and a lithium battery including the negative active material, and a method of manufacturing the negative active material.

2. Description of the Related Technology

Lithium secondary batteries generate electric energy by oxidation and reduction reactions occurring when lithium ions are intercalated into and deintercalated from a positive electrode and a negative electrode. Each of the electrodes includes an active material that enables intercalation and deintercalation of lithium ions, with an organic electrolytic solution or a polymer electrolytic solution interposed between the positive electrode and the negative electrode.

The carbon-based material such as artificial and natural graphite, and hard carbon and a non-carbon-based material such as Si and Sn can be used as a negative active material for lithium secondary batteries. These materials enable intercalation or deintercalation of lithium ions, and studies t have been continuously performed on their properties.

A non-carbon-based material such as Si and Sn has capacity that is 10 times greater than graphite. However, due to the volumetric expansion during charging and discharging, the capacity of the non-carbon-based material may be rapidly degraded. Thus, research into a variety of alloys and complexes has been conducted.

SUMMARY OF CERTAIN INVENTIVE ASPECTS

One aspect of the disclosure relates to a negative active material including a silicon-based alloy capable of reducing loss of Si caused by formation of inactive phase of silicon and increasing the lifespan of a lithium battery.

Another aspect of the disclosure relates to a negative electrode including the negative active material.

One aspect of the disclosure relates to a lithium battery employing the negative electrode.

One aspect of the disclosure relates to a method of manufacturing the negative active material.

Additional aspects will be set forth in part in the description which follows and, in part, will be apparent from the description, or may be learned by practice of the presented embodiments.

In some embodiments, the negative active material includes a silicon-based alloy having silicon (Si), aluminum (Al), and copper (Cu), wherein the silicon-based alloy includes: an alloy matrix including AlCu and $Al_2Cu$; and silicon nanoparticles dispersed in the alloy matrix, wherein a ratio of a sum of atomic fractions of Al and Cu contained in $Al_2Cu$ to a sum of atomic fractions of Al and Cu contained in AlCu is greater than about 0 and less than about 0.6 in the silicon-based alloy.

In some embodiments, the ratio of the sum of atomic fractions of Al and Cu contained in $Al_2Cu$ to the sum of atomic fractions of Al and Cu contained in AlCu may be greater than about 0.1 and less than about 0.5 in the silicon-based alloy.

In some embodiments, the ratio of an atomic fraction of Cu to an atomic fraction of Al in the silicon-based alloy may be greater than about 0.7 and less than about 1.

In some embodiments, the silicon-based alloy may include about 20 to about 70 at. % of Si, about 15 to about 45 at. % of Al, and about 10 to about 40 at. % of Cu, wherein the sum of atomic fractions of Si, Al, and Cu is 100 at. %.

In some embodiments, the silicon-based alloy may be pulverized to powder having a D50 in the range of about 0.3 μm to about 10 μm. In some embodiments, the silicon-based alloy is free of inactive silicon. In some embodiments, the silicon nanoparticles comprise active silicon. In some embodiments, the silicon nanoparticles have an average particle diameter in the range of 10 nm to 500 nm. In some embodiments, the negative active material further comprises a carbon material, lithium metal, lithium alloys, silicon oxide-based materials, or any mixture thereof which are capable of intercalating and deintercalating lithium ions.

In some embodiments, the negative electrode includes the negative active material.

In some embodiments, the lithium battery includes the negative electrode.

In some embodiments, the method of manufacturing the negative active material includes: preparing a mother alloy including about 20 to about 70 at. % of Si, about 15 to about 45 at. % of Al, and about 10 to about 40 at. % of Cu to prepare the silicon-based alloy; rapidly solidifying melts of the mother alloy to obtain a rapidly solidified alloy; and pulverizing the rapidly solidified alloy. In some embodiments, the mother alloy is prepared by vacuum induction melting, arc melting, or mechanical alloying. In some embodiments, the rapidly solidifying the melts of the mother alloy is performed by melt spinning, gas atomizing, or strip casting. In some embodiments, the rapidly solidifying the melts of the mother alloy comprises quenching the melts of the mother alloy at a rate in the range of $10^3$ K/sec to $10^7$ K/sec. In some embodiments, the melts of the mother alloy are injection-molded in a ribbon shape, and an injection-molded product having the ribbon shape has a thickness in the range of 5 μm to 20 μm. In some embodiments, the rapidly solidified alloy is pulverized into powder having a D50 in the range of 0.3 μm to 10 μm. the negative active material comprises a silicon-based alloy having silicon (Si), aluminum (Al), and copper (Cu), wherein the silicon-based alloy comprises: an alloy matrix comprising AlCu and $Al_2Cu$; and silicon nanoparticles dispersed in the alloy matrix, wherein a ratio of a sum of atomic fractions of Al and Cu contained in $Al_2Cu$ to a sum of atomic fractions of Al and Cu contained in AlCu is greater than 0 and less than 0.6 in the silicon-based alloy. In some embodiments, the ratio of the sum of atomic fractions of Al and Cu contained in $Al_2Cu$ to the sum of atomic fractions of Al and Cu contained in AlCu is greater than 0.1 and less than 0.5 in the silicon-based alloy. In some embodiments, a ratio of an atomic fraction of Cu to an atomic fraction of Al in the silicon-based alloy is greater than 0.7 and less than 1.

DETAILED DESCRIPTION OF CERTAIN INVENTIVE EMBODIMENTS

Figure 1:
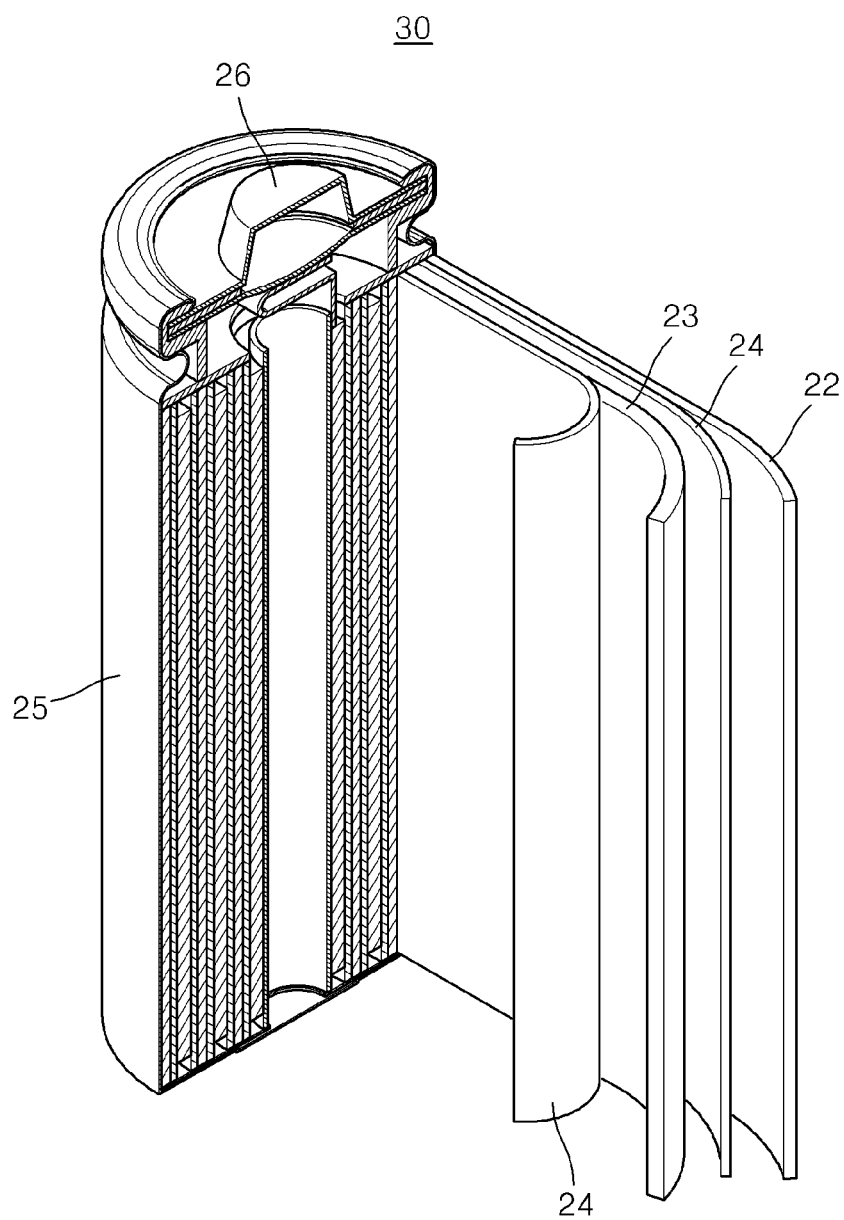
FIG. 1 is a schematic view of a cross-section of a lithium battery.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

Hereinafter, embodiments of the present disclosure will be described in more detail.

In some embodiments, the negative active material includes a silicon-based alloy having silicon (Si), aluminum (Al), and copper (Cu), wherein the silicon-based alloy includes an alloy matrix having AlCu and $Al_2Cu$ as part of the matrix; and silicon nanoparticles dispersed in the alloy matrix, wherein in the silicon-based alloy, a ratio of a sum of atomic fractions of Al and Cu contained in $Al_2Cu$ to the sum of atomic fractions of Al and Cu contained in AlCu ($Al_2Cu$/AlCu ratio) is greater than about 0 and less than about 0.6.

The silicon-based alloy may be a ternary alloy including Si, Al, and Cu.

Based on stoichiometric analysis, the silicon-based alloy may include about 20 to about 70 atomic percent (at. %) of Si, about 15 to about 45 at. % of Al, and about 10 to about 40 at. % of Cu. Here, the sum of atomic fractions of Si, Al, and Cu is 100 at. %. When the amount of Si is within the range described above, a discharge capacity of about 450 mAh/g to about 1990 mAh/g may be obtained in the $1^{st}$ cycle without loss of Si caused by formation of the matrix. Based on stoichiometric analysis, the silicon-based alloy may include about 25 to about 60 at. % of Si, about 20 to about 45 at. % of Al, and about 15 to about 40 at. % of Cu. Here, the sum of atomic fractions of Si, Al, and Cu is 100 at. %. When the amount of Si is within the range described above, a discharge capacity of about 580 mAh/g to about 1620 mAh/g may be obtained in the $1^{st}$ cycle without loss of Si caused by formation of the matrix. More particularly, for example, based on stoichiometric analysis, the silicon-based alloy may include about 30 to about 55 at. % of Si, about 20 to about 40 at. % of Al, and about 20 to about 35 at. % of Cu. Here, the sum of atomic fractions of Si, Al, and Cu is 100 at. %. When the amount of Si is within the range described above, a discharge capacity of about 710 mAh/g to about 1450 mAh/g may be obtained in the $1^{st}$ cycle without loss of Si caused by formation of the matrix. In addition, $Al_2Cu$ as well as AlCu may be formed in inactive phases by adjusting the composition ratio of Si, Al, and Cu. The inactive phases may efficiently inhibit volumetric expansion of the silicon-based alloy during charging and discharging, and provide excellent battery capacity properties.

In general, silicon contained in the silicon-based alloy is classified into active silicon and inactive silicon. The active silicon is directly related to the capacity of the silicon-based alloy since the active silicon may be involved in a reversible reaction with lithium ions. The inactive silicon forms an inactive phase with other metallic elements which is not involved in a reaction with lithium ions, thereby forming a matrix structure. The active silicon is generally precipitated in the inactive matrix as silicon nanoparticles and may be dispersed therein.

However, in some embodiments, the negative active material may not include inactive silicon in the silicon-based alloy. The inactive silicon is not involved in a reversible reaction with lithium ions. In other words, all silicon (Si) contained in the silicon-based alloy may be active silicon and be dispersed in the inactive matrix not including Si in a precipitated form.

Thus, the silicon-based alloy may reduce the loss of Si caused by formation of the inactive silicon. In some embodiments, upon comparison with conventional silicon-based alloys including inactive silicon, Si is not consumed by the formation of the matrix according to the current embodiment. In some embodiments, even when the content of Si is reduced, high capacity equal to conventional silicon-based alloys may be obtained according to the current embodiment.

The silicon nanoparticles may have an average particle diameter in the range of about 10 nm to about 500 nm. For example, the average particle diameter of the silicon nanoparticles may be in the range of about 10 nm to about 200 nm, about 10 nm to about 150 nm, or about 10 nm to about 100 nm.

The average particle diameter of the silicon nanoparticles may be obtained by measuring the size of silicon grains precipitated and dispersed in the inactive matrix. The silicon grain size may be calculated by Scherrer's equation using full width at half maximum for the Si(111) plane in an X-ray diffraction spectrum using CuK-alpha X-rays having a wavelength of 1.541 Å.

Since silicon nanoparticles having an average particle diameter within the range described above are uniformly dispersed in the alloy matrix, volumetric expansion of the silicon nanoparticles may be efficiently buffered by the alloy matrix surrounding the silicon nanoparticles during charging and discharging cycles.

Meanwhile, the alloy matrix is a matrix formed of an alloy having Al and Cu. The alloy matrix that is in an inactive phase does not react with lithium ions and can prevent volumetric expansion of the silicon-based alloy.

In some embodiments, the alloy matrix includes a binary alloy phase of AlCu and $Al_2Cu$ and may not include a ternary alloy of Si—Al—Cu. Since the binary alloy phase of AlCu and $Al_2Cu$ does not include inactive silicon, the content of Si that is consumed by formation of the inactive silicon may be reduced, thereby providing high battery capacity. A desired discharge capacity may be obtained by using only an amount of Si required to form the active silicon, and thus costs of raw materials may also be reduced.

Since the negative active material includes two inactive phases of AlCu and $Al_2Cu$ in the silicon-based alloy, strength of the alloy matrix and conductivity of electrode plates may be increased. The increase in the strength of the alloy matrix may inhibit destruction of the inactive phase caused by the volumetric expansion of the silicon nanoparticles during the repeated charging and discharging of a lithium battery and may also significantly increase the capacity retention rate during the repeated charging and discharging cycles.

On the other hand, the amount of Si used to form the inactive phase may be reduced even when the alloy matrix is formed of a single phase of AlCu or $Al_2Cu$. However, the alloy matrix including the single phase may have relatively lower strength and lower conductivity of electrode plates than the alloy matrix including the binary phase of AlCu and $Al_2Cu$. Thus, the inactive phase may become more easily destructed by the volumetric expansion of the silicon nanoparticles during the repeated charging and discharging of the lithium battery compared to what is disclosed in the present technology. Accordingly, the silicon nanoparticles that are an active phase are separated as the number of charging and discharging cycle increases, and thus reducing the discharge capacity.

In some embodiments, in the silicon-based alloy, the ratio of the sum of atomic fractions of Al and Cu contained in $Al_2Cu$ to the sum of atomic fractions of Al and Cu contained in AlCu ($Al_2Cu/AlCu$ ratio) is greater than about 0 and less than about 0.6. More particularly, the $Al_2Cu/AlCu$ ratio may be greater than about 0.1 and less than about 0.5. When the $Al_2Cu/AlCu$ ratio decreases, the strength of the alloy matrix is not sufficiently increased. When the $Al_2Cu/AlCu$ ratio increases, the inactive phase is softened, thereby increasing resistance against lithium ions when the lithium ions are intercalated into the negative active material. Thus, when the $Al_2Cu/AlCu$ ratio is greater than about 0 and less than about 0.6, more particularly, greater than about 0.1 and less than about 0.5, the capacity retention rate may be increased while the capacity and strength of the alloy matrix that is inactive phase is also increased.

In the silicon-based alloy, the ratio of an atomic fraction of Cu to an atomic fraction of Al (Cu/Al ratio) may be greater than about 0.7 and less than about 1. For example, the ratio of the atomic fraction of Cu to the atomic fraction of Al may be in the range of about 0.8 to about 0.95 in the silicon-based alloy. The $Al_2Cu/AlCu$ ratio may be adjusted greater than about 0 and less than about 0.6 by adjusting the Cu/Al ratio to be greater than about 0.7 and less than about 1 in the silicon-based alloy.

In some embodiments, the silicon-based alloy may be pulverized into powder having a D50 of about 0.3 μm to about 10 μm and used in preparation of a negative electrode. D50 as used herein refers to a cumulative particle diameter at 50% of the total cumulative particle diameter distribution of particles from the smallest particle diameter. The D50 may be measured by using a known method, for example, a particle size analyzer, transmission electron microscopy (TEM), or scanning electron microscopy (SEM). Alternatively, for example, the D50 may be easily obtained by measuring the particle size with a device using dynamic light-scattering, counting the number of particles within each particle size range by analyzing data, and calculating the D50 therefrom.

In some embodiments, negative active material includes the silicon-based alloy as an essential component and may further include any material for the negative active material which is commonly used in lithium batteries in addition to the essential component.

Examples of the material for negative active material may be a carbon-based material such as graphite and carbon, a lithium metal and lithium alloys, a silicon oxide-based material, or any mixture thereof which are capable of intercalating and deintercalating lithium ions.

In some embodiments, the negative active material can include a silicon-based alloy and a carbon-based material, wherein the carbon-based material may be crystalline carbon such as natural graphite, artificial graphite, expanded graphite, graphene, carbon black, fullerene soot, carbon nanotube, and carbon fiber, amorphous carbon such as soft carbon (low temperature calcined carbon), hard carbon, pitch carbide, mesophase pitch carbide, and calcined coke, or a combination of at least two thereof.

As such, when the carbon-based material is used together, oxidation reaction of the silicon-based alloy is inhibited, and a solid electrolyte interphase (SEI) layer may be efficiently formed, so that a stable layer is formed. The electrical conductivity may increase. Thus, charging and discharging characteristics of lithium may further be improved.

When the carbon-based material is used, the carbon-based material may be mixed or blended with the silicon-based alloy, or may be coated on the surface of the silicon-based alloy.

The amount of the material for the negative active material used together with the silicon-based alloy may be in the range of about 1 wt % to about 99 wt % based on the total amount of the material for the negative active material and the silicon-based alloy.

In some embodiments, when the silicon-based alloy is a major component in the negative active material, the content of the silicon-based alloy may be, for example, in the range of about 95 wt % to about 99 wt % based on the total amount of the material for the negative active material and the silicon-based alloy. If graphite or pitch, as amorphous carbon, is used as the material for the negative active material, graphite or pitch may be coated on the surface of the silicon-based alloy.

In some embodiments, when the silicon-based alloy is a minor component in the negative active material, the content of the silicon-based alloy may be, for example, in the range of about 1 to about 5 wt % based on the total amount of the material for the negative active material and the silicon-based alloy. If graphite or pitch, as amorphous carbon, is used as the material for the negative active material, graphite or pitch may function as a buffer of the silicon-based alloy, so that lifespan of the electrode may be increased.

Hereinafter, a method of manufacturing a negative active material including a silicon-based alloy will be described.

In some embodiments, the method of manufacturing a negative active material includes: preparing a mother alloy including about 20 at. % to about 70 at. % of Si, about 15 at. % to about 45 at. % of Al, and about 10 at. % to about 40 at. % of Cu to prepare the silicon-based alloy; rapidly solidifying melts of the mother alloy to obtain a rapidly solidified alloy; and pulverizing the rapidly solidified alloy.

The preparing of the mother alloy may be performed by vacuum induction melting (VIM), arc melting, or mechanical alloying. For example, the mother alloy may be prepared using VIM by which the mother alloy is melted in a vacuum in order to inhibit oxidation caused by exposure to air as much as possible. However, the method of preparing the mother alloy is not limited thereto, and any method of preparing a mother alloy well known in the art may also be used.

Raw materials used to form the silicon-based alloy are not limited as long as a desired composition ratio thereof is obtainable. For example, in order to mix elements used to form the silicon-based alloy at a desired composition ratio, elements, alloys, solid solutions, intermetallic compounds, or the like may be used.

In order to prepare a mother alloy having a composition ratio of about 20 at. % to about 70 at. % of Si, about 15 at. % to about 45 at. % of Al, and about 10 at. % to about 40 at. % of Cu, metal powders of the elements are respectively weighed and mixed to a target composition ratio of the mother alloy, and then the mother alloy of the silicon-based alloy may be prepared using a vacuum induction melting furnace. The vacuum induction melting furnace is an apparatus capable of melting metal having a high melting point by using high frequency induction. In the early stage of melting, the inside of the vacuum induction melting furnace is vaccumized, and then inert gas such as Ar is injected into the vacuum induction melting furnace to inhibit or reduce oxidation of the prepared mother alloy.

Then, the mother alloy prepared as described above is melted and the melts are rapidly solidified. The rapid solidification process is not particularly limited, but may be performed by using, for example, melt spinning, gas atomizing, or strip casting. Through the rapid solidification process, the inactive phases of AlCu and $Al_2Cu$ may form a matrix, and thus an alloy in which the active phase of silicon nanoparticles is uniformly dispersed in the matrix may be prepared.

In some embodiments, the rapid solidification process may be performed by melt spinning. For example, the melts of the mother alloy may be rapidly solidified while injection-molding the melts through a melt spinner using high frequency induction by a wheel rotating at a high speed. The rapid solidification process may include quenching the melts of the mother alloy at a rate of about $10^3$ K/sec to about $10^7$ K/sec.

Since the melts of the mother alloy are cooled by a wheel rotating at a high speed, the melts are injection-molded into a ribbon shape. The ribbon shape and the size of silicon nanoparticles dispersed in the alloy may vary according to the cooling speed. In order to obtain fine silicon nanoparticles, the cooling speed may be, for example, about 1000° C./s or higher. In addition, in order to obtain uniform silicon nanoparticles, the thickness of the injection-molded product having a ribbon shape may be adjusted in the range of, for example about 5 μm to about 20 μm. For example, the thickness of the ribbon may be adjusted in the range of about 7 μm to about 16 μm.

The rapidly solidified alloy that is an injection-molded product having a ribbon shape is pulverized into powder and used as a negative active material. The pulverized alloy powder may have a D50 in the range of about 0.3 to about 10 μm. The pulverization may be performed by using any known method commonly used in the art. For example, an apparatus for the pulverization may be an atomizer, a vacuum mill, a ball mill, a planetary ball, a beads mill, a jet mill, and the like.

Pulverizations may be classified into dry pulverizations and wet pulverizations, both of which may be used herein.

In some embodiments, the negative electrode can include the negative active material.

In some embodiments, the lithium battery can include a negative electrode including the negative active material; a positive electrode disposed opposite to the negative electrode; and an electrolyte disposed between the negative electrode and the positive electrode.

The negative electrode having the negative active material may be manufactured, for example, by preparing a negative active material composition through mixing the negative active material, a binder, and optionally a conductive agent in a solvent; and then molding the negative active material composition to a desired shape or coating the negative active material composition on a current collector, such as copper foil.

The binder used in the negative electrode active material composition assists binding of the negative electrode active material and the conductive agent, and binding with the current collector. The amount of the binder may be in the range of about 1 to about 50 parts by weight based on 100 parts by weight of the negative active material. For example, the amount of the binder may be in the range of about 1 to about 30 parts by weight, about 1 to about 20 parts by weight, or about 1 to about 15 parts by weight based on 100 parts by weight of the negative active material. Examples of the binder may include polyvinylidenefluoride, polyvinylidenechloride, polybenzimidazole, polyimide, polyvinylacetate, polyacrylonitrile, polyvinyl alcohol, carboxymethylcellulose (CMC), starch, hydroxypropylcellulose, regenerated cellulose, polyvinylpyrrolidone, tetrafluoroethylene, polyethylene, polypropylene, polystyrene, polymethylmethacrylate, polyaniline, acrylonitrilebutadienestyrene, phenol resin, epoxy resin, polyethyleneterephthalate, polytetrafluoroethylene, polyphenylsulfide, polyamideimide, polyetherimide, polyethylenesulfone, polyamide, polyacetal, polyphenyleneoxide, polybutyleneterephthalate, ethylene-propylene-diene monomer (EPDM) rubber, sulfonated EPDM rubber, styrene butadiene rubber, a fluoride rubber, and various copolymers.

The negative electrode may further include a conductive agent in order to further increase electrical conductivity by providing a sufficient conductive passage to the negative active material. Any conductive agent commonly used in lithium batteries may be used. Examples of the conductive agent are a carbon-based material such as carbon black, acetylene black, ketjen black, and carbon fiber (for example, a vapor phase growth carbon fiber); a metal-based material such as copper, nickel, aluminum, and silver, each of which may be used in powder or fiber form; a conductive polymer such as a polyphenylene derivative; and any mixture thereof. The amount of the conductive agent may be appropriately controlled. For example, the conductive agent may be added in such an amount that the weight ratio of the negative active material to the conductive agent is in the range of about 99:1 to about 90:10.

Examples of the solvent include but are not limited to N-methylpyrrolidone (NMP), acetone, water, and the like. The amount of the solvent may be in a range of about 1 to about 10 parts by weight based on 100 parts by weight of the negative active material. When the amount of the solvent is within this range, the process for forming the negative active material layer may be efficiently performed.

In some embodiments, the current collector is generally manufactured to have a thickness of about 3 to about 500 μm. The current collector may be any one of various current collectors that do not cause any chemical change in the battery and have conductivity. Examples of the current collector include copper, stainless steel, aluminum, nickel, titanium, calcined carbon, copper or stainless steel that is surface-treated with carbon, nickel, titanium or silver, and aluminum-cadmium alloys. In addition, the current collector may be processed to have fine irregularities on the surface thereof so as to enhance adhesive strength of the current collector to the negative active material, and may be used in any of various forms including films, sheets, foils, nets, porous structures, foams, and non-woven fabrics.

The negative active material composition may be directly coated on the current collector to manufacture the negative electrode plate. Alternatively, the negative electrode plate may be manufactured by casting the negative active material composition on a separate support to form a negative active material film, separating the negative active material film from the support, and laminating the negative active material film on a copper foil current collector. The negative electrode is not limited to the examples described above, and may have various other shapes.

The negative active material composition is not only used in preparation of electrodes of lithium batteries, but also used in preparation of a printable battery by being printed on a flexible electrode substrate.

In some embodiments, for the manufacture of a positive electrode, a positive active material composition is prepared by mixing a positive active material, a conductive agent, a binder, and a solvent.

Any lithium-containing metal oxide that is commonly used in the art may be used as the positive active material. For example, the lithium-containing metal may include at least one compound selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, and $a+b+c=1$), $LiNi_{1-y}Co_yO_2$ ($0\leq y<1$), $LiCo_{1-y}Mn_yO_2$ ($0\leq y<1$), $LiNi_{1-y}Mn_yO_2$ ($0\leq y<1$), $LiMn_{2-z}Ni_zO_4$ ($0<z<2$), $LiMn_{2-z}Co_zO_4$ ($0<z<2$), $LiCoPO_4$, and $LiCuPO_4$.

In some embodiments, the conductive agent, the binder, and the solvent used in the positive active material composition may be the same as those of the negative active material composition as described above. If desired, a plasticizer may further be added to the positive active material composition and the negative active material composition to form pores inside the electrode plates. In this regard, the amounts of the positive active material, the conductive material, the binder, and the solvent may be the same amount as those commonly used in lithium batteries.

The positive current collector may be any one of various current collectors that have a thickness in the range of about 3 μm to about 500 μm, do not cause any chemical change in the fabricated battery, and have high conductivity. For example, stainless steel, aluminum, nickel, titanium, calcined carbon, and aluminum or stainless steel that is surface-treated with carbon, nickel, titanium, silver, or the like may be used. The current collector may be processed to have fine irregularities on surfaces thereof so as to enhance adhesive strength of the current collector to the positive active material. The positive electrode current collector may be in any of various forms including films, sheets, foils, nets, porous structures, foams, and non-woven fabrics.

In some embodiments, the prepared positive active material composition may be directly coated on the positive current collector and dried to prepare a positive electrode plate. Alternatively, the positive active material composition may be cast on a separate support, and then a film separated from the support is laminated on the positive current collector to prepare the positive electrode plate.

In some embodiments, the positive electrode and the negative electrode may be separated from each other by a separator. Any separator that is commonly used in lithium batteries may be used. Particularly, a separator that has low resistance to migration of ions of an electrolyte and excellent electrolytic solution-retaining ability may be used. Examples of the separator may include glass fiber, polyester, Teflon, polyethylene, polypropylene, polytetrafluoroethylene (PTFE), and a combination thereof, each of which may be a nonwoven fabric or a woven fabric. The separator has a pore diameter in the range of about 0.01 μm to about 10 μm and a thickness in the range of about 5 μm to about 300 μm.

A lithium salt-containing non-aqueous electrolyte is composed of a non-aqueous electrolyte solution and lithium. As the non-aqueous electrolyte, a non-aqueous electrolyte solution, an organic solid electrolyte, or an inorganic solid electrolyte may be used.

Examples of the non-aqueous electrolyte solution may include any aprotic organic solvent such as N-methyl-2-pyrrolidone, propylene carbonate, ethylene carbonate, butylene carbonate, dimethyl carbonate, diethyl carbonate, gamma-butyro lactone, 1,2-dimethoxy ethane, tetrahydrofuran, 2-methyl tetrahydrofuran, dimethylsulfoxide, 1,3-dioxolane, formamide, dimethylformamide, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, and any combinations thereof.

Examples of the organic solid electrolyte may include polyethylene derivatives, polyethylene oxide derivatives, polypropylene oxide derivatives, phosphoric acid ester polymers, poly agitation lysine, polyester sulfide, polyvinyl alcohol, polyvinylidene fluoride, polymers containing ionic dissociation groups, and any combinations thereof.

Examples of the inorganic solid electrolyte may include a nitride, halide, or sulfate of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, and any combinations thereof.

Any lithium salt commonly used in lithium batteries may be used. The lithium salt is a material that is readily soluble in the non-aqueous electrolyte and may include at least one selected from the group consisting of $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborate lithium, lower aliphatic carboxylic acid lithium, lithium tetraphenyl borate, imide, and any combinations thereof.

Lithium batteries may be classified into lithium ion batteries, lithium ion polymer batteries, and lithium polymer batteries according to the type of the separator and electrolyte. In addition, lithium batteries may be classified into a cylindrical type, a rectangular type, a coin type, and a pouch type according to the shape of the battery, and may also be classified into a bulk type and a thin film type according to the size of the battery. Lithium batteries may be used either as primary lithium batteries or secondary lithium batteries.

The method of manufacturing a lithium battery is widely known in this field, and a detailed description thereof will not be provided here.

FIG. 1 schematically illustrates a structure of a lithium battery.

Referring to FIG. 1, the lithium battery 30 includes a positive electrode 23, a negative electrode 22, and a separator 24 disposed between the positive electrode 23 and the negative electrode 22. The positive electrode 23, the negative electrode 22, and the separator 24 are wound or folded, and then accommodated in a battery case 25. Then, an electrolyte is injected into the battery case 25 and the battery case 25 is sealed by a sealing member 26, thereby completing the manufacture of the lithium battery 30. The battery case 25 may have a cylindrical shape, a rectangular shape or a thin-film shape. The lithium battery may be a lithium ion battery.

The lithium battery may be suitable for use as a power source for electric vehicles and other power tools that require high capacity, high-power output, and high temperature conditions for operations. The lithium battery may also be suitable for use as a power source for conventional mobile phones and portable computers, and may be coupled to conventional internal combustion engines, fuel cells, or super-capacitors to be used in hybrid vehicles. In addition, the lithium battery may be used in all applications requiring high-power output, high voltage, and high temperature conditions for operations.

Hereinafter, one or more embodiments of the present disclosure will be described in detail with reference to the following examples. However, these examples are not intended to limit the scope of the one or more embodiments of the present disclosure.

Manufacture of Negative Active Material and Lithium Battery

A Si alloy negative active material only including an inactive phase of AlCu in a ternary alloy of Si—Al—Cu was prepared and used in a Comparative Example. Si alloy negative active materials including inactive phases of $Al_2Cu$ and AlCu were prepared and used in Examples. The Examples were classified into Examples 1 to 4 and Examples 5 to 8 according to the ratio between $Al_2Cu$ and AlCu. In Examples 1 to 4 and Examples 5 to 8, the amounts of active phase silicon were maintained in the same level respectively. Thus, influence of the ratio between $Al_2Cu$ and AlCu on lifespan may be accurately tested by maintaining the discharge capacity in a similar level.

COMPARATIVE EXAMPLE

First, Si, Al, and Cu were mixed at a ratio of 34 at. %:33 at. %:33 at. %. The mixture was added to a vacuum induction melting furnace (Yein Tech., Korea) and melted in a vacuum in order to inhibit oxidation reaction caused by the exposure to air, thereby preparing a mother alloy.

The prepared mother alloy was cut into large lumps and added to an injection-molding pipe of a melt spinner (Yein Tech., Korea), and then the mother alloy was melted by high frequency induction heating in an argon (Ar) gas atmosphere, injection-molded to a ribbon shaped alloy by ejecting the melted mother alloy to a rotating Cu wheel through a nozzle, and rapidly solidified.

The prepared ribbon shaped alloy was pulverized using a ball mill to obtain Si alloy powder having an average particle diameter (D50) of about 3 to about 5 μm. Here, silicon nanoparticles had an average particle diameter of 74 nm.

A coin cell was manufactured according to the following process using the prepared Si alloy powder as a negative active material.

A negative active material slurry was prepared by mixing the Si alloy powder as a negative active material, poly amide imide as a binder, and Ketjen Black and graphite as conductive agents at a weight ratio of 80:8:2:10. N-methylpyrollidone was then added to the mixture to adjust the viscosity of the mixture until a solid content thereof reached 60 wt %. The prepared slurry was coated on a copper foil current collector having a thickness of 10 μm to manufacture a negative electrode plate. The completely coated electrode plate was dried at the temperature of 110° C. for 15 minutes, followed by pressing, thereby completing the manufacture of a negative electrode having a density of 1.5 g/cc. The dried negative electrode plate was heat-treated in a vacuum at 350° C. for 1 hour, and the electrode plate was cut to a size of 16 mm to prepare a negative electrode to be applied to a coin cell. A Li metal as a counter electrode and a polyethylene separator (Celgard 3501) having a thickness of 20 μm were used, and an electrolyte was injected thereto. The resultant structure was pressed to complete the manufacture of a 2016R type coin cell. In this case, the electrolyte was 1.10 M $LiPF_6$ dissolved in a mixed solvent of ethylene carbonate (EC), diethyl carbonate (DEC), and fluoroethylene carbonate (FEC) at a volumetric ratio of EC:DEC:FEC of 5:70:25.

EXAMPLE 1

A composition ratio of the mother alloy was changed to simultaneously form inactive phases of $Al_2Cu$ in addition to those of AlCu. Si alloy powder was prepared according to the same procedures in the Comparative Example, except that the ratio of Si, Al, and Cu to prepare the mother alloy was 34 at. %:33.5 at. %:32.5 at. %, and a coin cell was prepared using the same. Here, silicon nanoparticles had an average particle diameter of 55 nm.

EXAMPLE 2

A composition ratio of the mother alloy was changed to simultaneously form inactive phases of $Al_2Cu$ in addition to those of AlCu. Si alloy powder was prepared according to the same procedures as the Comparative Example, except that the ratio of Si, Al, and Cu to prepare the mother alloy was 34 wtat. %:34.5 at. %:31.5 at. %, and a coin cell was prepared using the same. Here, silicon nanoparticles had an average particle diameter of 53 nm.

EXAMPLE 3

A composition ratio of the mother alloy was changed to simultaneously form inactive phases of $Al_2Cu$ in addition to those of AlCu. Si alloy powder was prepared according to the same procedures as the Comparative Example, except that the ratio of Si, Al, and Cu to prepare the mother alloy was 34 at. %:36 at. %:30 at. %, and a coin cell was prepared using the same. Here, silicon nanoparticles had an average particle diameter of 52 nm.

EXAMPLE 4

A composition ratio of the mother alloy was changed to simultaneously form inactive phases of $Al_2Cu$ in addition to those of AlCu. Si alloy powder was prepared according to the same procedures as the Comparative Example, except that the ratio of Si, Al, and Cu to prepare the mother alloy was 34 at. %:37 at. %:29 at. %, and a coin cell was prepared using the same. Here, silicon nanoparticles had an average particle diameter of 52 nm.

EXAMPLE 5

A composition ratio of the mother alloy was changed to simultaneously form inactive phases of $Al_2Cu$ in addition to those of AlCu. Si alloy powder was prepared according to the same procedures as the Comparative Example, except that the ratio of Si, Al, and Cu to prepare the mother alloy was 55 at. %:22.84 at. %:22.16 at. %, and a coin cell was prepared using the same.

EXAMPLE 6

A composition ratio of the mother alloy was changed to simultaneously form inactive phases of $Al_2Cu$ in addition to those of AlCu. Si alloy powder was prepared according to the same procedures as the Comparative Example, except that the ratio of Si, Al, and Cu to prepare the mother alloy was 55 at. %:23.52 at. %:21.48 at. %, and a coin cell was prepared using the same.

EXAMPLE 7

A composition ratio of the mother alloy was changed to simultaneously form inactive phases of $Al_2Cu$ in addition to those of AlCu. Si alloy powder was prepared according to the same procedures as the Comparative Example, except that the ratio of Si, Al, and Cu to prepare the mother alloy was 55 at. %:24.55 at. %:20.45 at. %, and a coin cell was prepared using the same.

EXAMPLE 8

A composition ratio of the mother alloy was changed to simultaneously form inactive phases of $Al_2Cu$ in addition to those of AlCu. Si alloy powder was prepared according to the same procedures as the Comparative Example, except that the ratio of Si, Al, and Cu to prepare the mother alloy was 55 at. %:25.23 at. %:19.77 at. %, and a coin cell was prepared using the same.

EVALUATION EXAMPLE 1

Phase Analysis of Si Alloy Powder

Phase analysis results of the Si alloy powders prepared according to the Comparative Example and Examples 1 to 4 obtained using an X-ray diffractometer (X'Pert PRO MPD, PANalytical) are shown in FIGS. 2 through 7. Evaluation was performed while CuK-alpha X-ray having a wavelength of 1.541 Å was irradiated.

Composition ratios of the silicon-based alloys prepared according to the Comparative Example and Example 1 to 8 were respectively shown in Table 1 below.

TABLE 1

| | Composition ratio (at. %) | | | Composition ratio (wt %) | | | Cu/Al ratio | Active Si (at. %) | AlCu (at. %) | $Al_2Cu$ (at. %) | $Al_2Cu$/ AlCu ratio |
|---|---|---|---|---|---|---|---|---|---|---|---|
| | Si | Al | Cu | Si | Al | Cu | | | | | |
| Comparative Example | 34 | 33 | 33 | 24.22 | 22.58 | 53.20 | 1.00 | 34 | 66 | 0 | 0 |
| Example 1 | 34 | 33.5 | 32.5 | 24.33 | 23.03 | 52.64 | 0.97 | 34 | 63 | 3 | 0.048 |
| Example 2 | 34 | 34.5 | 31.5 | 24.56 | 23.94 | 51.50 | 0.91 | 34 | 57 | 9 | 0.158 |
| Example 3 | 34 | 36 | 30 | 24.91 | 25.34 | 49.75 | 0.83 | 34 | 48 | 18 | 0.375 |
| Example 4 | 34 | 37 | 29 | 25.15 | 26.30 | 48.55 | 0.78 | 34 | 42 | 24 | 0.571 |
| Example 5 | 55 | 22.84 | 22.16 | 43.27 | 17.27 | 39.46 | 0.97 | 55 | 42.93 | 2.07 | 0.048 |
| Example 6 | 55 | 23.52 | 21.48 | 43.58 | 17.91 | 38.51 | 0.91 | 55 | 38.85 | 6.15 | 0.158 |
| Example 7 | 55 | 24.55 | 20.45 | 44.04 | 18.89 | 37.07 | 0.83 | 55 | 32.72 | 12.28 | 0.375 |
| Example 8 | 55 | 25.23 | 19.77 | 44.36 | 19.55 | 36.09 | 0.78 | 55 | 28.64 | 16.36 | 0.571 |

Figure 2:
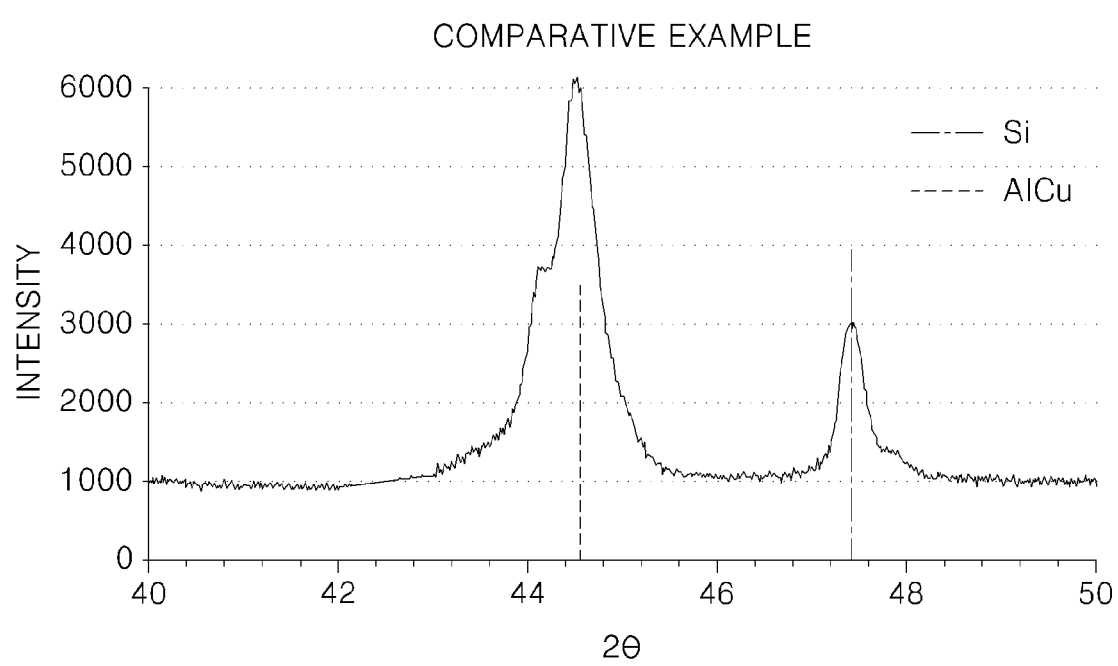
FIG. 2 is a graph illustrating X-ray diffraction (XRD) test results of silicon-based alloy powder prepared according to a Comparative Example.

Referring to FIG. 2, only AlCu is formed in the inactive phase in the silicon-based alloy powder according to the Comparative Example. That is, all of 34 at. % of Si is in the active phase which may be bound to lithium ions.

Figure 3:
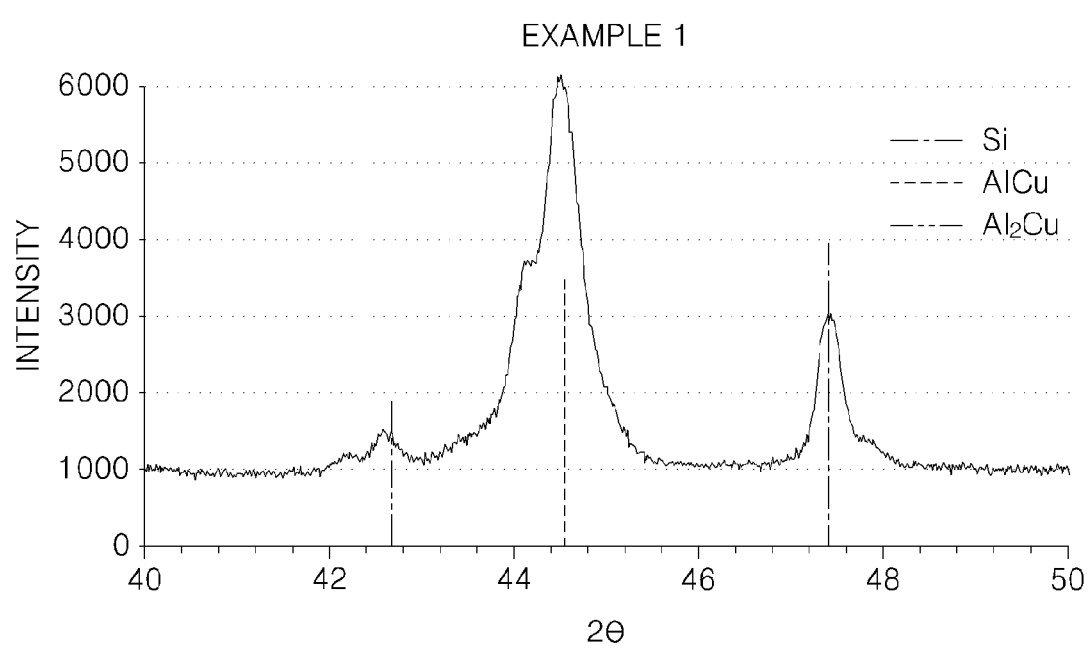
FIG. 3 is a graph illustrating XRD test results of silicon-based alloy powder prepared according to Example 1.
Figure 4:
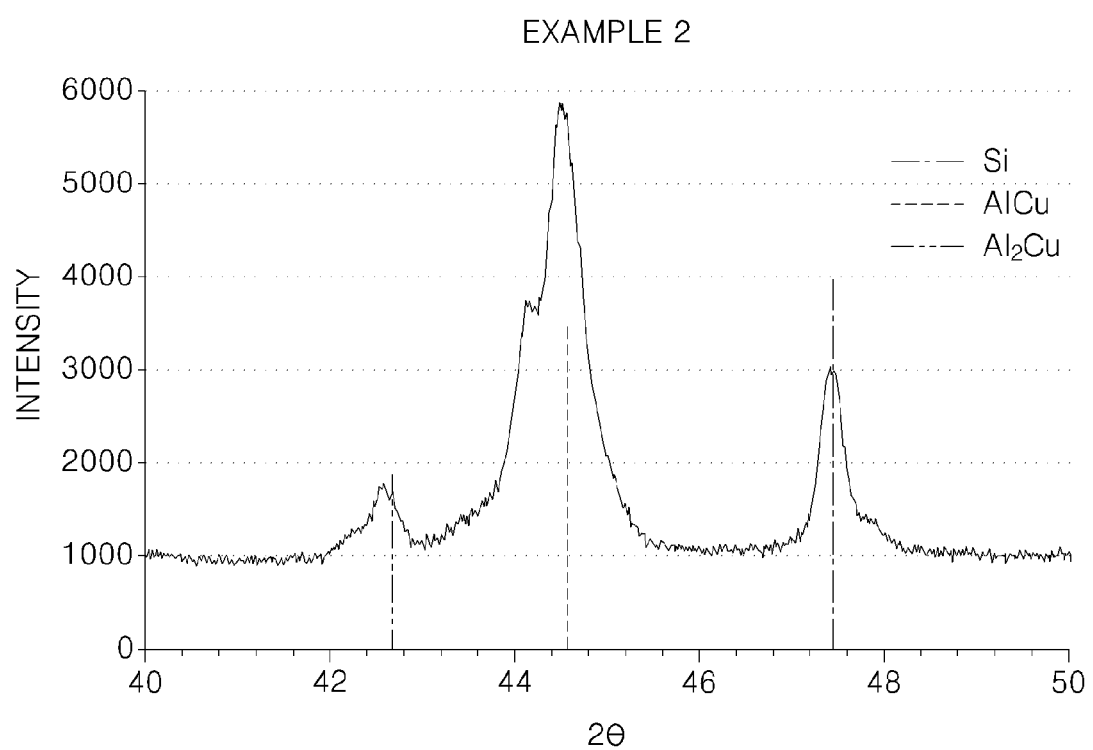
FIG. 4 is a graph illustrating XRD test results of silicon-based alloy powder prepared according to Example 2.
Figure 5:
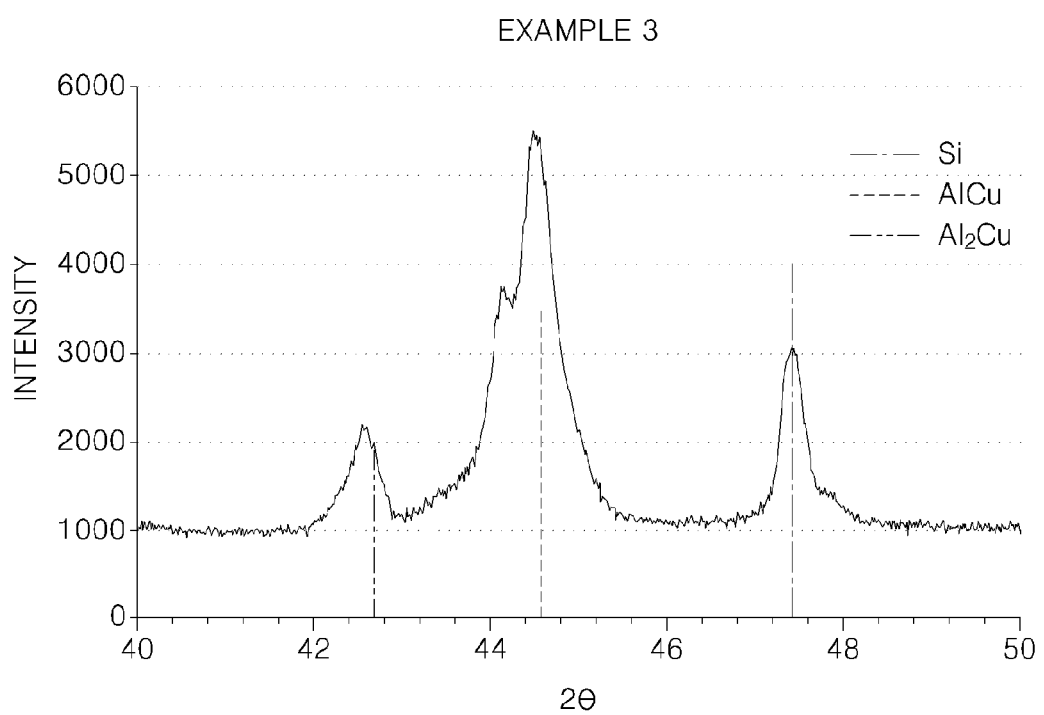
FIG. 5 is a graph illustrating XRD test results of silicon-based alloy powder prepared according to Example 3.
Figure 6:
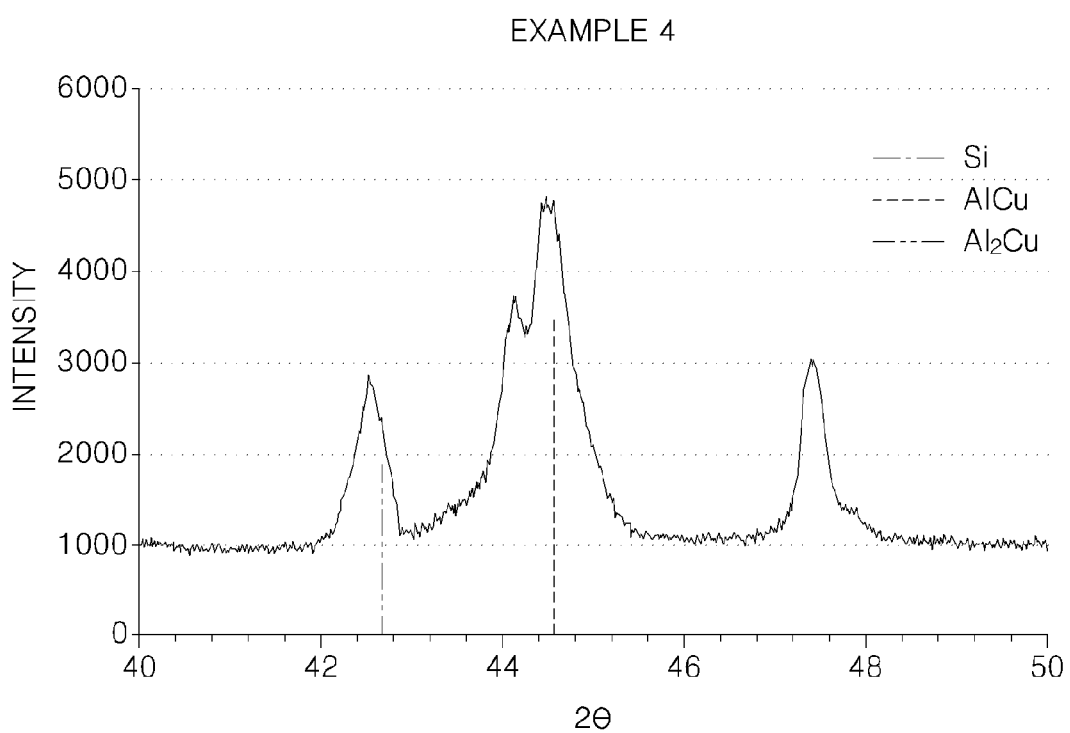
FIG. 6 is a graph illustrating XRD test results of silicon-based alloy powder prepared according to Example 4.

On the other hand, both AlCu and $Al_2Cu$ are formed in the inactive phases in the silicon-based alloy powders according to Examples 1 to 4 as illustrated in FIGS. 3 to 6. Due to the low amount of the $Al_2Cu$ phase, the $Al_2Cu$/AlCu ratio was the lowest in Example 1, thus, as illustrated in FIG. 3, the $Al_2Cu$ phase has the weakest peak. Due to the high amount of $Al_2Cu$ phase, the $Al_2Cu$/AlCu ratio was the highest in Example 4, thus, as illustrated in FIG. 6, the $Al_2Cu$ phase has the strongest peak.

As described above, Example 1 exhibited the lowest amount of the $Al_2Cu$ phase, and the amount of the $Al_2Cu$ phase increased in the order of Examples 2, 3, and 4. This is confirmed by the increase of the peaks of $Al_2Cu$ illustrated in FIGS. 3 to 6. Meanwhile, as described above, the content of the active phase of Si that has a considerable influence on the discharge capacity maintained in the same level.

Examples 5 to 8 having the same Cu/Al ratio and $Al_2Cu$/ AlCu ratio as Examples 1 to 4 exhibited a similar tendency.

EVALUATION EXAMPLE 2

Evaluation of Lifespan of Cell

Figure 7:
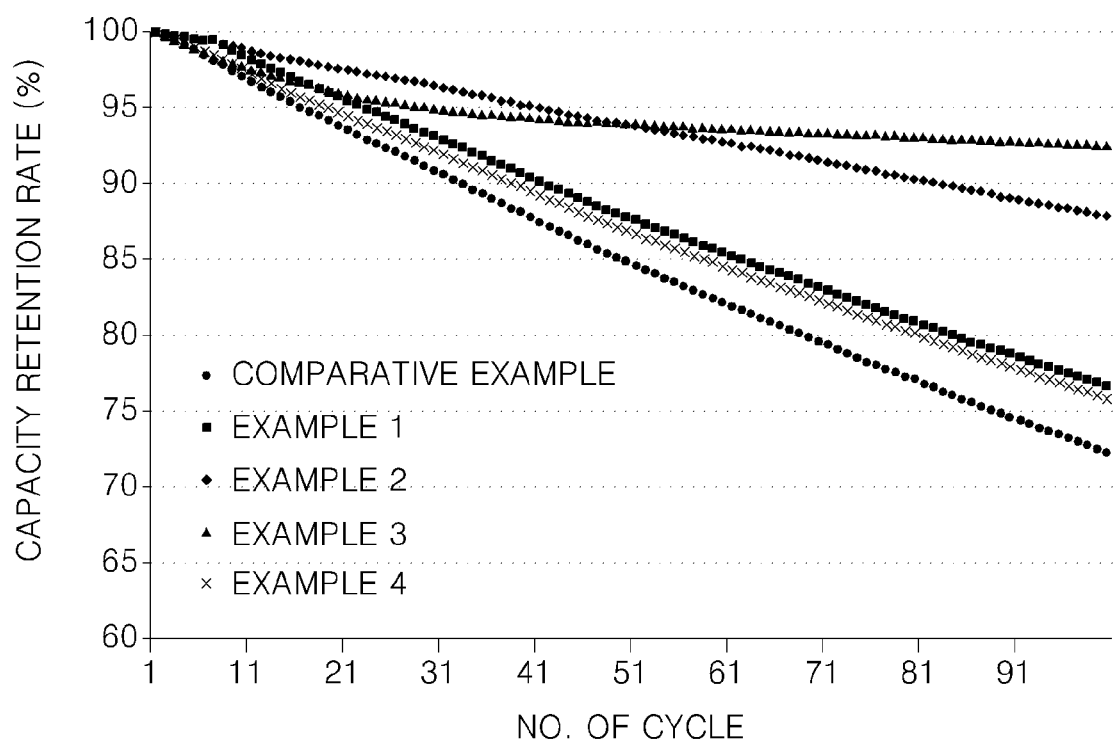
FIG. 7 is a graph illustrating capacity retention rates of coin cells prepared according to the Comparative Example and Examples 1 to 4 on a per cycle basis.

Capacity retention rates (CRRs) of coin cells prepared in the Comparative Example and Examples 1 to 8 were analyzed after charging at 1.0 C and discharging at 1.0 C. Capacity retention rates measured at respective cycles are shown in FIG. 7. Here, the capacity retention rate is defined using Equation 1 below.

$$\text{Capacity retention rate [\%]} = [\text{Discharge capacity of each cycle/Discharge capacity of } 1^{st} \text{ cycle}] \times 100 \quad \text{Equation 1}$$

Capacity retention rates measured after 100 cycles are shown in Table 2 below.

TABLE 2

| | Capacity retention rate after 100 cycles (%) |
|---|---|
| Comparative Example | 72.3 |
| Example 1 | 76.7 |
| Example 2 | 87.9 |
| Example 3 | 92.5 |
| Example 4 | 75.9 |

Referring to Table 2 and FIG. 7, although the coin cell according to the comparative example has a high capacity retention rate at the early stage, the capacity retention rate was reduced due to additional discharge capacity reduction from the middle stage. This often occurs in silicon-based alloys. As the inactive phase of AlCu is destructed due to volumetric expansion caused by repeated intercalation and deintercalation of lithium ions, the active phase of silicon nanoparticles is separated, thereby reducing discharge capacity.

On the other hand, as illustrated in Table 2 and FIG. 7, the coin cells according to Examples 1 to 4 exhibited higher capacity retention rates than that of the Comparative Example. These results indicate that destruction of the inactive phase of Examples 1 to 4 caused by the volumetric expansion is relatively reduced compared to that of the Comparative Example because the inactive phase of $Al_2Cu$ was formed in the Si alloy and strength thereof was increased. In Examples 2 and 3, where the $Al_2Cu$/AlCu ratio is greater than about 0.1 and less than about 0.5, the capacity retention rate was considerably increased by adding suitable amounts of $Al_2Cu$.

While higher discharge capacities may be obtained in the $1^{st}$ cycle according to Examples 5 to 8 compared to Examples 1 to 4 because the Si contents according to Examples 5 to 8 are higher than those according to Examples 1 to 4. However, capacity retention rates thereof were similar to each other after 100 cycles.

In some embodiments, the negative active material includes the silicon-based alloy including Si, Al, and Cu which includes AlCu and $Al_2Cu$ in the alloy matrix, thereby increasing the lifespan of a lithium battery. Furthermore, since the alloy matrix does not include inactive silicon, the loss of Si used to form the inactive silicon may be reduced.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present disclosure have been described with reference to the figures, it will be understood by those of ordinary skill in the art that various changes in form and details may be made therein without departing from the spirit and scope of the present disclosure as defined by the following claims.

What is claimed is:

1. A negative active material comprising a silicon-based alloy having silicon (Si), aluminum (Al), and copper (Cu), wherein the silicon-based alloy comprises:
    an alloy matrix comprising AlCu and $Al_2Cu$; and
    silicon nanoparticles dispersed in the alloy matrix,
    wherein a ratio of a sum of atomic fractions of Al and Cu contained in $Al_2Cu$ to a sum of atomic fractions of Al and Cu contained in AlCu is greater than 0 and less than 0.6 in the silicon-based alloy.

2. The negative active material of claim 1, wherein the ratio of the sum of atomic fractions of Al and Cu contained in $Al_2Cu$ to the sum of atomic fractions of Al and Cu contained in AlCu is greater than 0.1 and less than 0.5 in the silicon-based alloy.

3. The negative active material of claim 1, wherein the silicon-based alloy comprises 20 to 70 at. % of Si, 15 to 45 at. % of Al, and 10 to 40 at. % of Cu, wherein the sum of atomic fractions of Si, Al, and Cu is 100 at. %.

4. The negative active material of claim 1, wherein a ratio of an atomic fraction of Cu to an atomic fraction of Al in the silicon-based alloy is greater than 0.7 and less than 1.

5. The negative active material of claim 1, wherein the silicon-based alloy is pulverized to powder having a D50 in the range of 0.3 μm to 10 μm.

6. The negative active material of claim 1, wherein the silicon-based alloy is free of inactive silicon.

7. The negative active material of claim 1, wherein the silicon nanoparticles comprise active silicon.

8. The negative active material of claim 1, wherein the silicon nanoparticles have an average particle diameter in the range of 10 nm to 500 nm.

9. The negative active material of claim 1, wherein the negative active material further comprises a carbon-based material, lithium metal, lithium alloys, silicon oxide-based materials, or any mixture thereof which are capable of intercalating and deintercalating lithium ions.

10. A negative electrode comprising the negative active material according to claim 1.

11. A lithium battery comprising the negative electrode of claim 10.

12. A method of manufacturing the negative active material according to claim 1, the method comprising:
    preparing a mother alloy comprising 20 to 70 at. % of Si, 15 to 45 at. % of Al, and 10 to 40 at. % of Cu to prepare the silicon-based alloy;
    rapidly solidifying melts of the mother alloy to obtain a rapidly solidified alloy; and
    pulverizing the rapidly solidified alloy.

13. The method of claim 12, wherein the mother alloy is prepared by vacuum induction melting, arc melting, or mechanical alloying.

14. The method of claim 12, wherein the rapidly solidifying the melts of the mother alloy is performed by melt spinning, gas atomizing, or strip casting.

15. The method of claim 12, wherein the rapidly solidifying the melts of the mother alloy comprises quenching the melts of the mother alloy at a rate in the range of $10^3$ K/sec to $10^7$ K/sec.

16. The method of claim 12, wherein the melts of the mother alloy are injection-molded in a ribbon shape, and an injection-molded product having the ribbon shape has a thickness in the range of 5 μm to 20 μm.

17. The method of claim 12, wherein the rapidly solidified alloy is pulverized into powder having a D50 in the range of 0.3 μm to 10 μm.

18. The method of claim 12, wherein the ratio of the sum of atomic fractions of Al and Cu contained in $Al_2Cu$ to the sum of atomic fractions of Al and Cu contained in AlCu is greater than 0.1 and less than 0.5 in the silicon-based alloy.

19. The method of claim 12, wherein a ratio of an atomic fraction of Cu to an atomic fraction of Al in the silicon-based alloy is greater than 0.7 and less than 1.

* * * * *